(12) United States Patent
Anghileri

(10) Patent No.: US 8,251,670 B2
(45) Date of Patent: Aug. 28, 2012

(54) DEVICE AND METHOD FOR PROTECTING AIRCRAFT COMPONENT FROM COLLISION WITH FLYING OBJECTS

(75) Inventor: Marco Anghileri, Milan (IT)

(73) Assignee: Agusta S.P.A., Samarate (IT)

( * ) Notice: Subject to any disclaimer, the term of this patent is extended or adjusted under 35 U.S.C. 154(b) by 1083 days.

(21) Appl. No.: 12/169,206

(22) Filed: Jul. 8, 2008

(65) Prior Publication Data

US 2009/0016872 A1 Jan. 15, 2009

(30) Foreign Application Priority Data

Jul. 9, 2007 (EP) .................................... 07425425

(51) Int. Cl.
*F03B 11/00* (2006.01)
(52) U.S. Cl. .................................... 416/245 R; 416/248
(58) Field of Classification Search ............. 416/245 R, 416/248
See application file for complete search history.

(56) References Cited

U.S. PATENT DOCUMENTS

| 4,261,168 A | 4/1981 | Grigorian et al. |
| 6,089,824 A * | 7/2000 | Soares ........................ 415/121.1 |
| 6,358,014 B1 * | 3/2002 | Chou et al. ................ 416/245 R |

FOREIGN PATENT DOCUMENTS

| DE | 10 2004 018 585 A1 | 12/2005 |
| DE | 10-2004-018585 | * 12/2005 |

* cited by examiner

Primary Examiner — Zandra Smith
Assistant Examiner — Jamie C Niesz
(74) Attorney, Agent, or Firm — Berenato & White, LLC

(57) ABSTRACT

A device for protecting an aircraft component from collision with a flying object, the device having: a main member rotating about an axis and subject to collision with a flying object; and diverting means connected angularly to the main member, also subject to collision with the flying object, and designed, in the event of collision of the main member with the flying object, to reduce the axial momentum of the flying object and divert the flying object radially with respect to the axis.

6 Claims, 5 Drawing Sheets

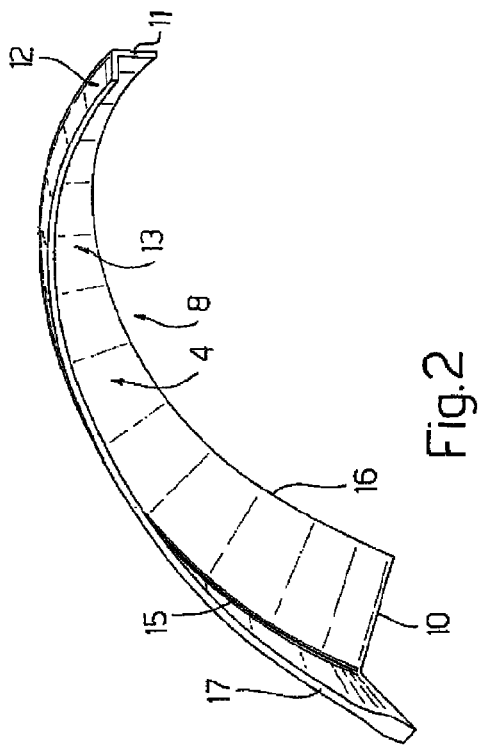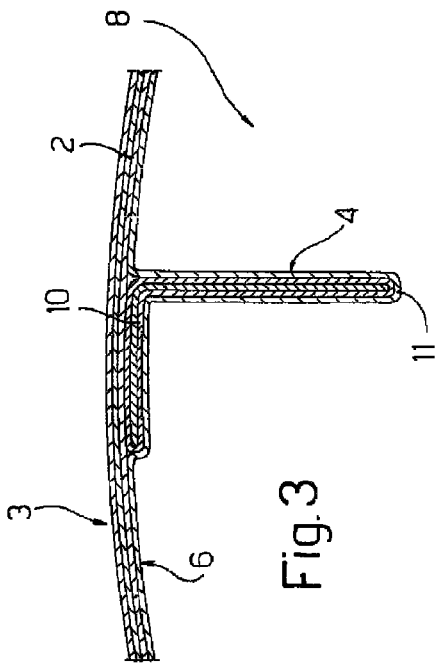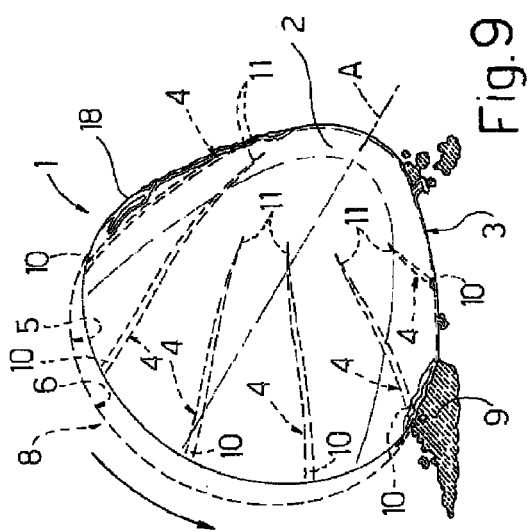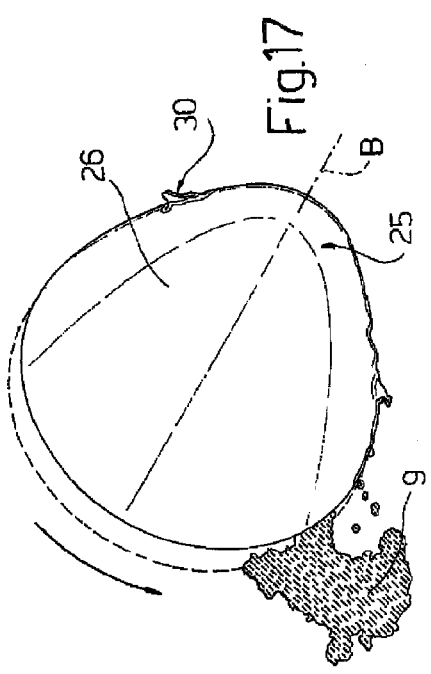

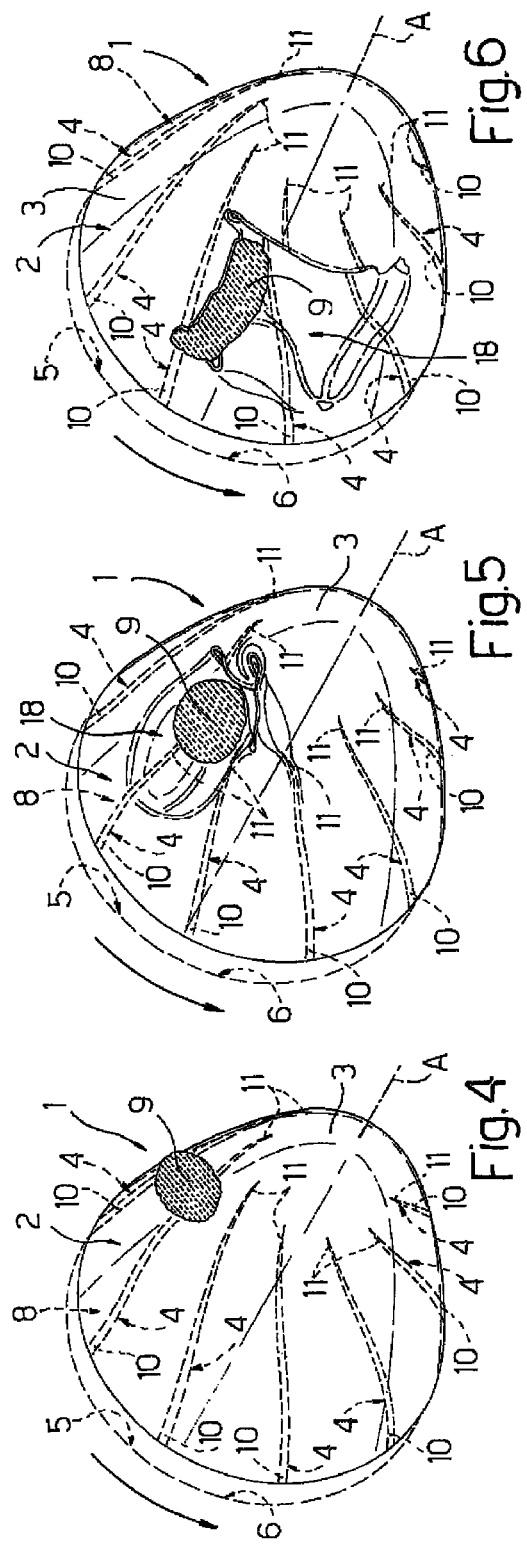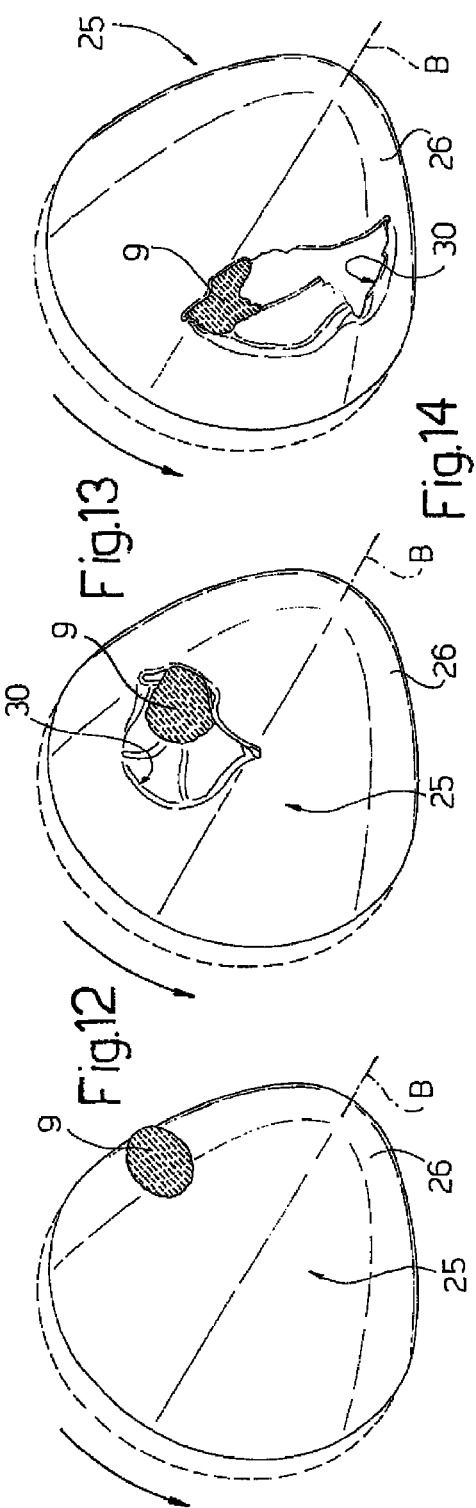

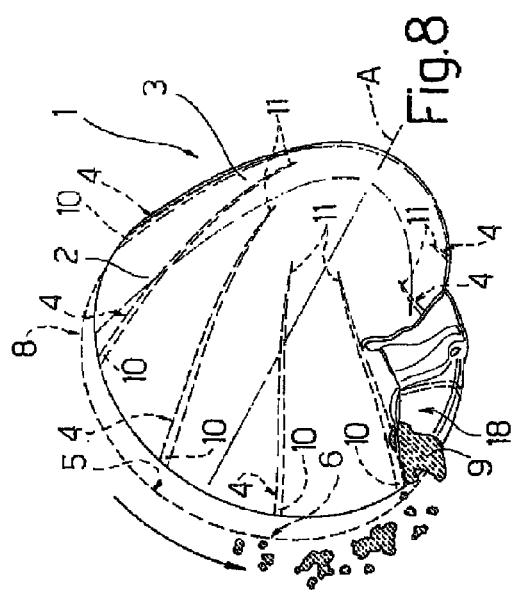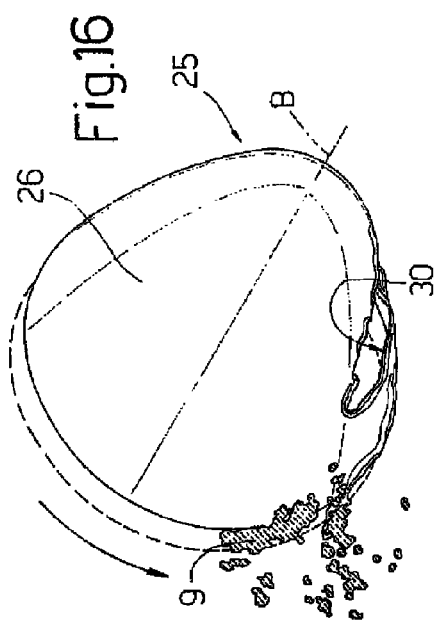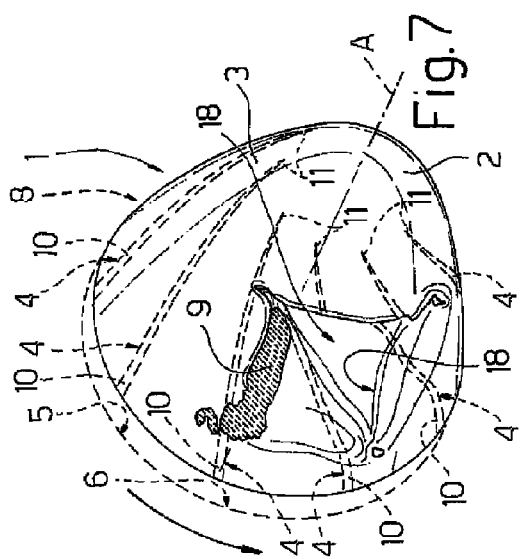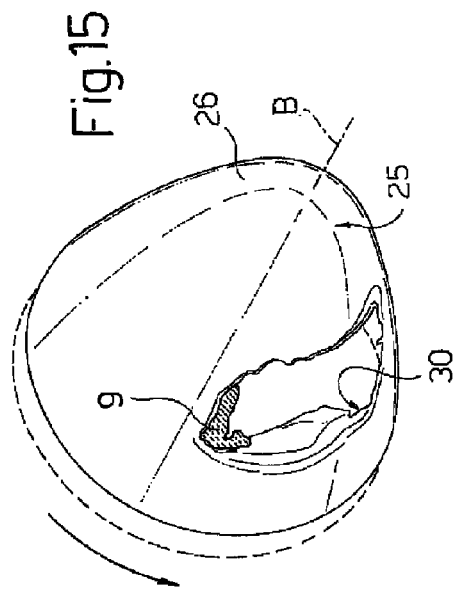

DEVICE AND METHOD FOR PROTECTING AIRCRAFT COMPONENT FROM COLLISION WITH FLYING OBJECTS

This application is a U.S. Patent Application which claims priority of European Patent Application No. 07425425.1 filed Jul. 9, 2007 and is hereby incorporated by reference in its entirety.

The present invention relates to a device and method for protecting an aircraft component from collision with flying objects.

BACKGROUND OF THE INVENTION

As is known, the components essential to sustaining an aircraft, such as engine components, must be protected from damage caused by collision with, and possible ingestion of, flying blunt objects, such as birds.

More specifically, certification regulations governing certain categories of aircraft require that, in the event of damage to an engine component caused by collision with a bird, the aircraft be capable of maintaining flight long enough to reach a landing site.

Accordingly, aircraft are certification tested to ensure the engine components maintain a given degree of efficiency in the event of collision with a bird.

To prevent damage to engine components and comply with certification test requirements, engine component protection devices have been proposed, which substantially comprise an ogival shield surrounding the engine component and fitted to a fixed supporting member of the engine component.

The shield must be particularly thick, and hence heavy, to withstand collision with a bird and so at least partly prevent damage to the engine component.

Such shields are therefore unsatisfactory, by greatly increasing the overall weight of the aircraft and so impairing performance and increasing consumption.

A need is felt to reduce the weight of such shields, while at the same time ensuring sufficient protection, as demonstrated by engine component certification tests, to sustain flight of the aircraft for a predetermined length of time in the event of collision with a bird, and so comply with certification regulations.

SUMMARY OF THE INVENTION

It is an object of the present invention to provide a straightforward, low-cost protection device designed to satisfy the above need in connection with the aforementioned known protection devices.

According to the present invention, there is provided an aircraft component collision protection device, as claimed in the attached claims.

According to the present invention, there is also provided a method of protecting an aircraft component from collision with a flying object, as claimed in the attached claims.

BRIEF DESCRIPTION OF THE DRAWINGS

A preferred, non-limiting embodiment of the present invention will be described by way of example with reference to the accompanying drawings, in which:

FIG. 2 shows a detail of FIG. 1;

FIG. 3 shows a further detail of FIG. 1;

FIGS. 4 to 9 show views in perspective of successive stages in collision of a bird with the FIG. 1 device;

FIGS. 12 to 17 show views in perspective of successive stages in collision of a bird with a comparison protection device employed by the Applicant to assess performance of the protection device according to the invention;

DETAILED DESCRIPTION OF THE INVENTION

Figure 1:
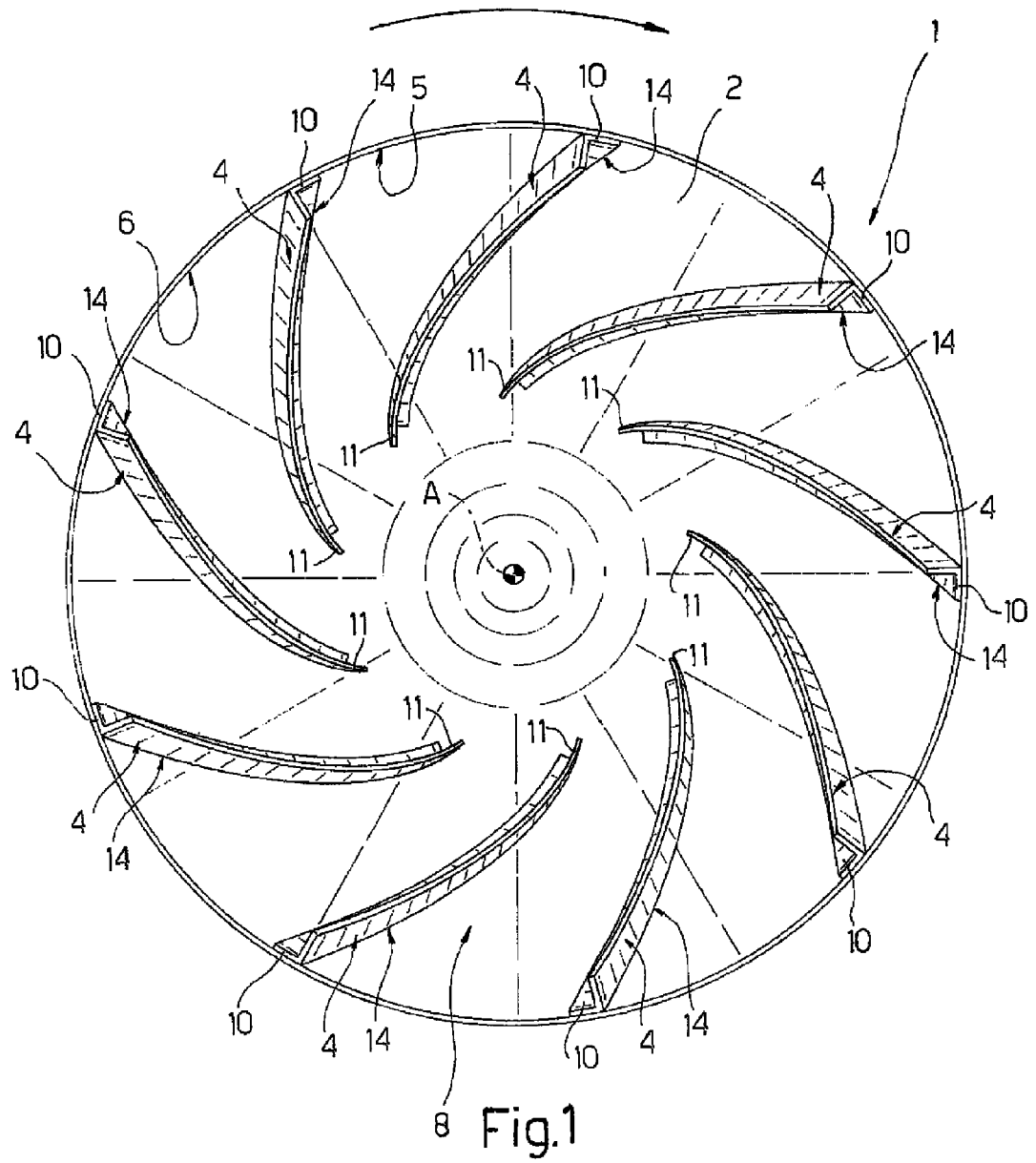
FIG. 1 shows a rear view of a protection device in accordance with the invention.
Figure 11:
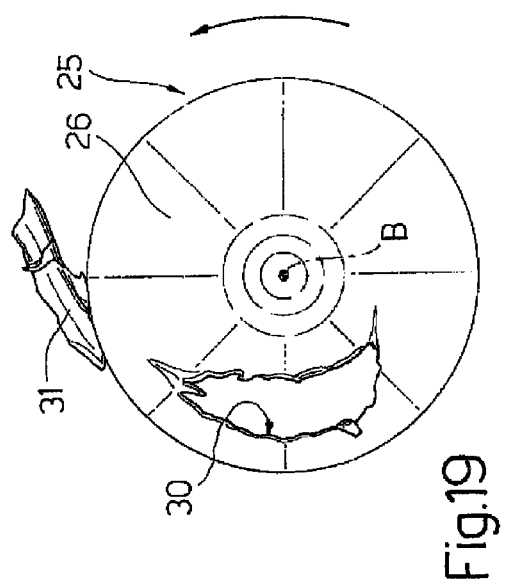
FIGS. 10 and 11 show side and front views, respectively, of the FIG. 1 device after collision with a bird.
Figure 10:
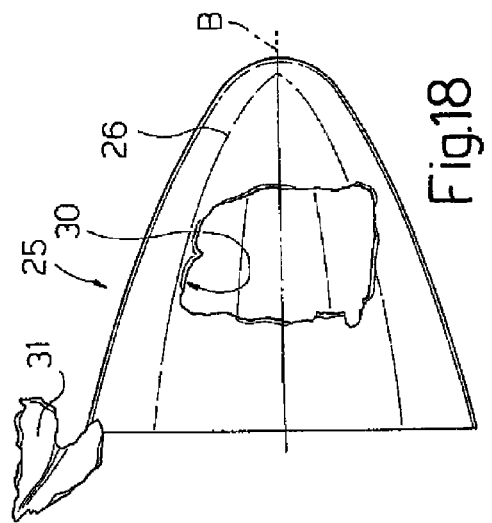

With reference to FIGS. 1 to 11, number 1 indicates a collision protection device for an aircraft component (not shown), e.g. an engine having a shaft and a casing.

Device 1 advantageously comprises a shield 2 rotating about an axis A and subject to collision with a bird 9 (only shown schematically in FIGS. 4 to 9; and diverting means 8 also subject to collision with the bird 9 colliding with the shield, and which, in that event, are designed to reduce the momentum of bird 9 along axis A and divert bird 9 radially with respect to axis A.

More specifically, shield 2 is ogival to define a cavity 5 housing the engine, and is fixed to a shaft of the engine to rotate in the same direction as the shaft about axis A as indicated in the drawings.

Shield 2 comprises a surface 3 subject to collision with bird 9 and facing outwards of the aircraft in use; and, on the opposite side to surface 3, a surface 6 supporting diverting means 8.

Diverting means 8 comprise a number of—in the example shown, nine—ribs 4 projecting from surface 6 of shield 2 in a direction crosswise to axis A.

More specifically, each rib 4 comprises an end 10 fixed to surface 6 of shield 2, and an end 11 opposite end 10.

Each rib 4 comprises a wall 12 and a wall 13 (only shown in FIG. 2) which extend between a common edge 15 and respective edges 17, 16.

Edges 15, 16, 17 are curved, so that walls 12, 13 are also curved.

The curvature of edges 15, 16, 17 imparts a concave shape to each rib 4 in the rotation direction of shield 2. As shown in FIGS. 2 and 3, each rib 4 is L-shaped in section crosswise to its curved extension direction, so walls 12, 13 are perpendicular to each other at each point along the cross section of rib 4.

The distance between edges 15, 16 and 15, 17, and therefore the width of walls 13, 12 and the size of each rib 4, decreases from end 10 to end 11.

The thickness of walls 12, 13 is such as to maximize the reduction in momentum along axis A and radial deviation of bird 9, without exceeding a given total weight of shield 2.

Each rib 4 is twisted, from respective end 11, in the rotation direction of shield 2.

In other words, end 10 of each rib 4 angularly precedes end 11 of the same rib 4 in the rotation direction of shield 2 and ribs 4.

Ribs 4 are equally spaced angularly inside cavity 5.

In other words, ribs 4 are arranged inside cavity 5 so that ends 10, 11 and corresponding points of adjacent ribs 4 are the same angular distance apart with respect to axis A.

Each rib 4 is separated from the adjacent rib 4 by a cavity 14.

Each cavity 14 decreases in size from ends 10 to ends 11 of the two adjacent ribs 4.

Ribs 4 and shield 2 are preferably made of composite material.

FIGS. 12 to 19 show a protection device 25 with no diverting means 8, and which was used as a reference by the Applicant for numerical simulations to assess the efficiency of diverting means 8 and ribs 4.

Very briefly, device 25 is defined by a shield 26 housing the engine and rotating about an axis B.

Shield 26 is identical to shield 2, except that it has no diverting means 8 or ribs 4.

On colliding with shield 2, bird 9 (FIGS. 4 to 9) breaks through surface 3 of shield 2.

The impact (FIGS. 4 to 9) damages shield 2, thus deforming shield 2 and forming openings 18 in surface 3.

Following impact, portions 20 of the material of shield 2 (FIGS. 10 and 11) are raised with respect to openings 18.

On breaking through shield 2 (FIGS. 8 to 11), bird 9 is diverted radially with respect to axis A by the rib 4 currently crossing the trajectory of bird 9.

Since the rib 4 in question rotates about axis A, the momentum of bird 9 along axis A is greatly reduced, and bird 9 itself is diverted in a plane perpendicular to axis A, thus reducing impact on the engine.

The effectiveness of device 1 according to the invention, as compared with comparison device 25, is shown in Table C below.

More specifically, Table C shows the percentage reduction in the force discharged by bird 9 on a hypothetical flat target behind shield 2. For the sake of simplicity, a reference force of 100 is assumed in the case of the comparison device.

TABLE C

| Solution | Force discharged | Variation |
| --- | --- | --- |
| Device 25 used for comparison | 100.0 | Reference |
| Device 1 according to the invention | 7.8 | −92% |

Upon impact, rib 4 also breaks up bird 9 (FIGS. 8 and 9).

The Applicant has also observed that portions 20 of material (FIGS. 10 and 11) are not detached completely from openings 18.

On the contrary, portions 20 remain attached at their end edges to surface 3 of shield 2, as opposed to being hurled onto the engine.

As shown in FIGS. 12 to 17, impact of bird 9 on device 25 damages—in particular, forms openings 30 in—the surface of shield 26.

Figure 19:
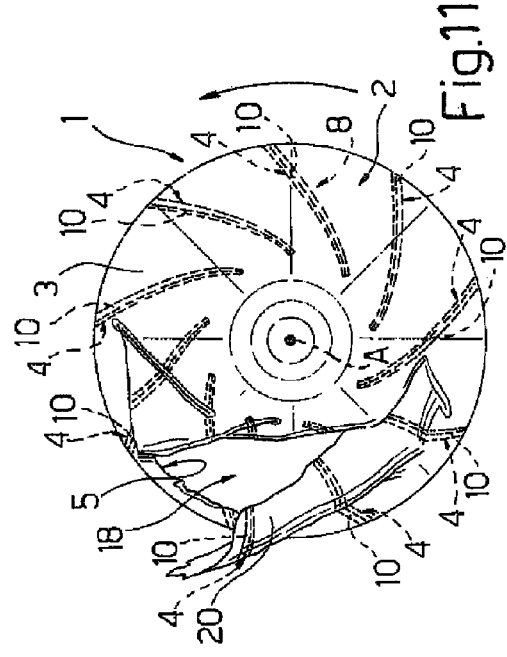
FIGS. 18 and 19 show side and front views, respectively, of the comparison protection device after collision with a bird.
Figure 18:
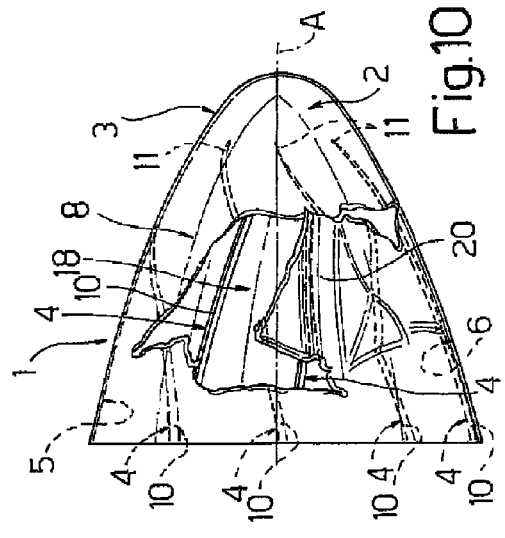

As shown in FIGS. 18 and 19, unlike device 1, impact of bird 9 on device 25 is likely to result in the bird striking the engine, and in detachment of portions 31 of shield 26 from openings 30.

This is due to bird 9 not being diverted radially on impact with shield 26, and so conserving considerable axial momentum, even after colliding with shield 26.

This residual axial momentum is sufficient to form openings 30 and detach portions 31.

The advantages of device 1 and the method according to the present invention will be clear from the foregoing description.

In particular, device 1 provides, with a lighter overall weight, for preventing or minimizing damage to the engine in the event of bird 9 colliding with surface 3. More specifically, damage control is sufficient to allow the engine enough range for the aircraft to reach a landing site.

The engine, in fact, is protected by rotation about axis A of the rib 4 crossing the trajectory of bird 9; which rib 4 diverts bird 9 radially with respect to axis A, and greatly reduces the momentum of bird 9 along axis A.

The additional weight of ribs 4 is less than that produced, to achieve the same impact-reducing effect, by thickening the structure of shield 2.

Certification regulations can thus be complied with, while at the same time reducing the additional weight of shield 2, with no impairment in performance of the aircraft, and no increase in consumption.

Radially diverting bird 9 also greatly reduces the risk of bird 9 being ingested by the engine.

The Applicant has also observed that, once diverted radially with respect to axis A, bird 9 maintains a greater amount of kinetic energy than following impact with devices 25 with no diverting means 8.

As a result, less force is discharged on device 1 than on device 25, thus enabling a reduction in the design loads, and hence weight, of device 1, while still ensuring the required degree of engine protection.

Finally, in the event of impact, portions 20 remain at least partly connected to the rest of shield 2 of device 1, thus preventing high-speed detachment of portions of shield 2 from further damaging the engine.

Clearly, changes may be made to protection device 1 and the method as described and illustrated herein without, however, departing from the scope as defined in the accompanying Claims.

In particular, the number of ribs 4 may be multiplied by a given factor, and the weight of each rib 4 reduced by the same factor, to achieve better distributed reinforcement of shield 2.

To simplify construction, ribs 4 need not be twisted, or may even be twisted the opposite way with respect to FIG. 1 (i.e. end 11 may angularly precede end 10 in the rotation direction of shield 2). In this configuration, device 1 still maintains a degree of effectiveness which, though not optimum, is far superior to that of comparison device 25, by virtue of the validity of the method defined in claim 9.

Finally, ribs 4 may be replaced with blades.

The invention claimed is:

1. A device (1) for protecting an aircraft component from collision with a flying object (9), comprising:
    a main member (2) rotating about an axis (A) and defining a cavity (5) for housing said aircraft component, said main member (2) having a first surface (3) facing outwards of the device (1) and being subject to collision with a flying object (9) and a second surface (6) opposite said first surface (3); and
    diverting means (8) connected angularly to said main member (2), also subject to collision with said flying object (9), and comprising a number of ribs (4) extending crosswise to said axis (A);
    said diverting means (8) designed, in the event of collision of said main member (2) with said flying object (9), to reduce the axial momentum of said flying object (9) and divert said flying object (9) radially with respect to said axis (A);
    said diverting means (8) arranged inside said cavity (5) and integrally supported by said second surface (6) of said main member (2) opposite said first surface (3).

2. The device as claimed in claim 1, wherein each of said ribs (4) is curved in the same direction as the rotation direction of said main member (2) about said axis (A), and as of a radially inner end (11) of said rib with respect to said axis (A).

3. The device as claimed in claim 1, wherein each of said ribs (4) decreases in size from a radially outer end (10), attached to said main member (2), to a radially inner end (11) opposite said radially outer end (10).

4. The device as claimed in claim 1, wherein each of said ribs (4) comprises a first wall (12) and a second wall (13) perpendicular to each other.

5. The device as claimed in claim 1, wherein said ribs (4) are equally spaced angularly with respect to said axis (A).

6. An aircraft component comprising a collision protection device (1) as claimed in claim 1.

* * * * *